US010112720B2

(12) United States Patent
Maslakow

(10) Patent No.: US 10,112,720 B2
(45) Date of Patent: Oct. 30, 2018

(54) METHOD AND APPARATUS FOR A HOMOGENEOUS THERMOPLASTIC LEG SUPPORT

(71) Applicant: Reliant Worldwide Plastics, LLC, Plano, TX (US)

(72) Inventor: William H. Maslakow, Lewisville, TX (US)

(73) Assignee: Reliant Worldwide Plastics, LLC, Plano, TX (US)

( * ) Notice: Subject to any disclaimer, the term of this patent is extended or adjusted under 35 U.S.C. 154(b) by 0 days.

(21) Appl. No.: 15/297,548

(22) Filed: Oct. 19, 2016

(65) Prior Publication Data

US 2017/0113803 A1  Apr. 27, 2017

Related U.S. Application Data

(60) Provisional application No. 62/245,504, filed on Oct. 23, 2015.

(51) Int. Cl.
*B64D 11/06* (2006.01)
*B29C 45/16* (2006.01)
*B29C 45/14* (2006.01)
*B29K 101/12* (2006.01)
*B29K 105/20* (2006.01)
(Continued)

(52) U.S. Cl.
CPC .... *B64D 11/0648* (2014.12); *B29C 45/14065* (2013.01); *B29C 45/14819* (2013.01); *B29C 45/1657* (2013.01); *B29C 2045/1668* (2013.01); *B29K 2101/12* (2013.01); *B29K 2105/12* (2013.01); *B29K 2105/20* (2013.01); *B29K 2707/04* (2013.01); *B29K 2715/00* (2013.01);
(Continued)

(58) Field of Classification Search
CPC ............ B64D 11/0648; B29C 45/1657; B29C 45/14065; B29C 45/14819; B29C 2045/1668; B29L 2031/7502; B29L 2031/771; B29L 2031/3076; B29K 2101/12; B29K 2709/08; B29K 2105/12; B29K 2707/04; B29K 2105/20; B29K 2715/00
USPC ................ 248/188, 188.1, 188.8; 297/452.1, 297/452.18, 411.2, 411.3, 411.34, 411.35, 297/411.36, 411.46
See application file for complete search history.

(56) References Cited

U.S. PATENT DOCUMENTS 2,064,435 A   12/1936  Loeffler
3,323,656 A    6/1967  Weiss et al.
(Continued)

FOREIGN PATENT DOCUMENTS

CA      2258068 A1    7/1999
CA      2569596 A1   12/2005
(Continued)

OTHER PUBLICATIONS

U.S. Appl. No. 14/048,840, Maslakow et al.
(Continued)

*Primary Examiner* — Muhammad Ijaz
(74) *Attorney, Agent, or Firm* — Braxton Perrone, PLLC

(57) ABSTRACT

A leg support includes a support element. A reinforcing element is disposed on the support element. The support element is chemically compatible with the reinforcing element. A homogeneous chemical bond is formed between the support element and the reinforcing element.

8 Claims, 5 Drawing Sheets

(51) Int. Cl.
  *B29K 707/04* (2006.01)
  *B29L 31/30* (2006.01)
  *B29L 31/00* (2006.01)
  *B29K 105/12* (2006.01)

(52) U.S. Cl.
  CPC ............... *B29L 2031/3076* (2013.01); *B29L 2031/7502* (2013.01); *B29L 2031/771* (2013.01)

(56) References Cited

U.S. PATENT DOCUMENTS

| | | | |
|---|---|---|---|
| 4,159,071 A | 6/1979 | Roca | |
| 4,339,488 A | 7/1982 | Brokmann | |
| 4,405,669 A | 9/1983 | Pott | |
| 4,837,251 A | 6/1989 | Okey et al. | |
| 4,840,761 A * | 6/1989 | Zenhausern | B29C 33/123 264/254 |
| 4,933,131 A * | 6/1990 | Okey | B29C 44/14 264/255 |
| 5,049,342 A * | 9/1991 | Scanlon | B29C 45/14467 264/250 |
| 5,141,816 A * | 8/1992 | Walker | C08J 5/12 428/420 |
| 5,233,743 A | 8/1993 | Robertson et al. | |
| 5,551,755 A | 9/1996 | Lindberg | |
| 5,727,357 A | 3/1998 | Arumugasaamy et al. | |
| 5,769,496 A | 6/1998 | Gryp | |
| 5,871,207 A | 2/1999 | Yoshida | |
| 6,899,363 B2 | 5/2005 | Dry | |
| 6,903,924 B1 | 6/2005 | Tyner | |
| 6,966,533 B1 | 11/2005 | Kalis et al. | |
| 7,005,092 B2 | 2/2006 | Dooley et al. | |
| 7,357,443 B2 | 4/2008 | Wolff et al. | |
| 7,926,879 B2 | 4/2011 | Schmitz et al. | |
| 8,132,861 B2 * | 3/2012 | Cone | B60N 2/753 297/411.32 |
| 8,505,997 B2 | 8/2013 | Hipshier et al. | |
| 8,567,839 B2 * | 10/2013 | Kalus | B60R 13/0243 296/39.1 |
| 8,596,206 B2 | 12/2013 | Legeay | |
| 2002/0074688 A1 * | 6/2002 | Smith | B29C 45/1657 264/247 |
| 2004/0007791 A1 | 1/2004 | Lenferink et al. | |
| 2004/0118853 A1 | 6/2004 | Schaal et al. | |
| 2005/0140157 A1 | 6/2005 | Emerling | |
| 2005/0201080 A1 | 9/2005 | Seward | |
| 2006/0097544 A1 | 5/2006 | Cowelchuk et al. | |
| 2007/0101671 A1 | 5/2007 | Decks | |
| 2007/0207292 A1 | 9/2007 | Cowelchuk et al. | |
| 2007/0262632 A1 | 11/2007 | Cody et al. | |
| 2008/0023600 A1 | 1/2008 | Perlman | |
| 2008/0136230 A1 | 6/2008 | Ling | |
| 2008/0277987 A1 | 11/2008 | Deadrick | |
| 2009/0174234 A1 | 7/2009 | Vignal et al. | |
| 2009/0196597 A1 | 8/2009 | Messinger et al. | |
| 2011/0127812 A1 | 6/2011 | DeVoe | |
| 2011/0155854 A1 | 6/2011 | Bakker et al. | |
| 2011/0204683 A1 * | 8/2011 | Roy | B60N 2/24 297/163 |
| 2011/0278885 A1 | 11/2011 | Procter et al. | |
| 2011/0316320 A1 | 12/2011 | Kulkarni et al. | |
| 2012/0181839 A1 | 7/2012 | Michalak et al. | |
| 2012/0306241 A1 | 12/2012 | Winter et al. | |
| 2012/0325123 A1 | 12/2012 | Schoerkhuber et al. | |
| 2013/0004696 A1 | 1/2013 | Volgers et al. | |
| 2013/0011623 A1 | 1/2013 | Jones et al. | |
| 2013/0082156 A1 | 4/2013 | Conner | |
| 2013/0119727 A1 | 5/2013 | Lavelle et al. | |
| 2013/0122246 A1 | 5/2013 | Berger et al. | |
| 2013/0169011 A1 | 7/2013 | Evans | |
| 2013/0244021 A1 * | 9/2013 | Pozzi | B64D 11/06 428/317.9 |
| 2013/0320742 A1 | 12/2013 | Murolo et al. | |
| 2014/0077531 A1 | 3/2014 | Preisler et al. | |
| 2014/0183238 A1 | 7/2014 | Lin | |
| 2014/0198473 A1 | 7/2014 | Shah et al. | |
| 2014/0261097 A1 | 9/2014 | Eilers et al. | |
| 2014/0375090 A1 * | 12/2014 | Wegenka | B60N 2/242 297/188.09 |
| 2015/0068435 A1 | 3/2015 | Maslakow | |
| 2015/0197075 A1 | 7/2015 | Yizze, III et al. | |
| 2015/0314501 A1 | 11/2015 | Maslakow | |
| 2015/0336495 A1 | 11/2015 | Maslakow | |
| 2015/0360784 A1 | 12/2015 | Maslakow | |
| 2016/0023769 A1 * | 1/2016 | Zheng | B64D 11/0648 297/452.18 |
| 2016/0176357 A1 | 6/2016 | Maslakow | |
| 2016/0375618 A1 | 12/2016 | Maslakow et al. | |

FOREIGN PATENT DOCUMENTS

| | | |
|---|---|---|
| CA | 2641166 A1 | 4/2010 |
| CH | 362224 A | 5/1962 |
| DE | 3518054 C1 | 1/1987 |
| DE | 102008057220 B4 | 8/2013 |
| EP | 0048055 A2 | 3/1982 |
| EP | 0492129 A1 | 7/1992 |
| EP | 0928804 A1 | 7/1999 |
| EP | 1685009 A1 | 8/2006 |
| EP | 1820394 A1 | 8/2007 |
| EP | 2608493 A1 | 6/2013 |
| JP | S5642950 A | 4/1981 |
| WO | WO-01072861 A2 | 10/2001 |
| WO | WO-2005049391 A1 | 6/2005 |
| WO | WO-2009053573 A2 | 4/2009 |
| WO | WO-2013036848 A1 | 3/2013 |
| WO | WO-2013144351 A1 | 10/2013 |
| WO | WO-2013187767 A1 | 12/2013 |
| WO | WO-2013187768 A1 | 12/2013 |
| WO | WO-2014058884 A1 | 4/2014 |
| WO | WO-2015038630 A1 | 3/2015 |

OTHER PUBLICATIONS

U.S. Appl. No. 14/482,623, Maslakow.
U.S. Appl. No. 14/703,208, Maslakow.
U.S. Appl. No. 14/719,668, Maslakow.
U.S. Appl. No. 14/736,643, Maslakow.
U.S. Appl. No. 14/979,161, Maslakow.
U.S. Appl. No. 15/178,386, Maslakow.
U.S. Appl. No. 15/261,138, Maslakow.
Copenheaver, Blaine R.; "International Search Report" prepared for PCT/US2014/054968 as dated Dec. 19, 2014, 2 pages.
Mans, Peter; "International Search Report" prepared for PCT/US2013/063887 as dated Dec. 20, 2013; 4 pages.
Mans, Peter; "Written Opinion of the International Searching Authority" for International Application No. PCT/US2013/063887 as dated Dec. 20, 2013; 10 pages.
Accessory Power; "TabGRAB Tablet Car Headrest Mount Holder with Reindorced No-Slip Display Design for Samsung Galaxy Tab 3 10.1/Acer Iconia ASUS MeMO Pad FHD 10, VivoTab RT & More 10-inch Tablets"; http://www.amazon.com/gp/product/B0051SU7ZW?ie-UTF8&ref_=de_a_smtd&showDetailTechData=1#technical-data; Nov. 2, 2011; 6 pages.
U.S. Appl. No. 15/339,480, Maslakow.

* cited by examiner

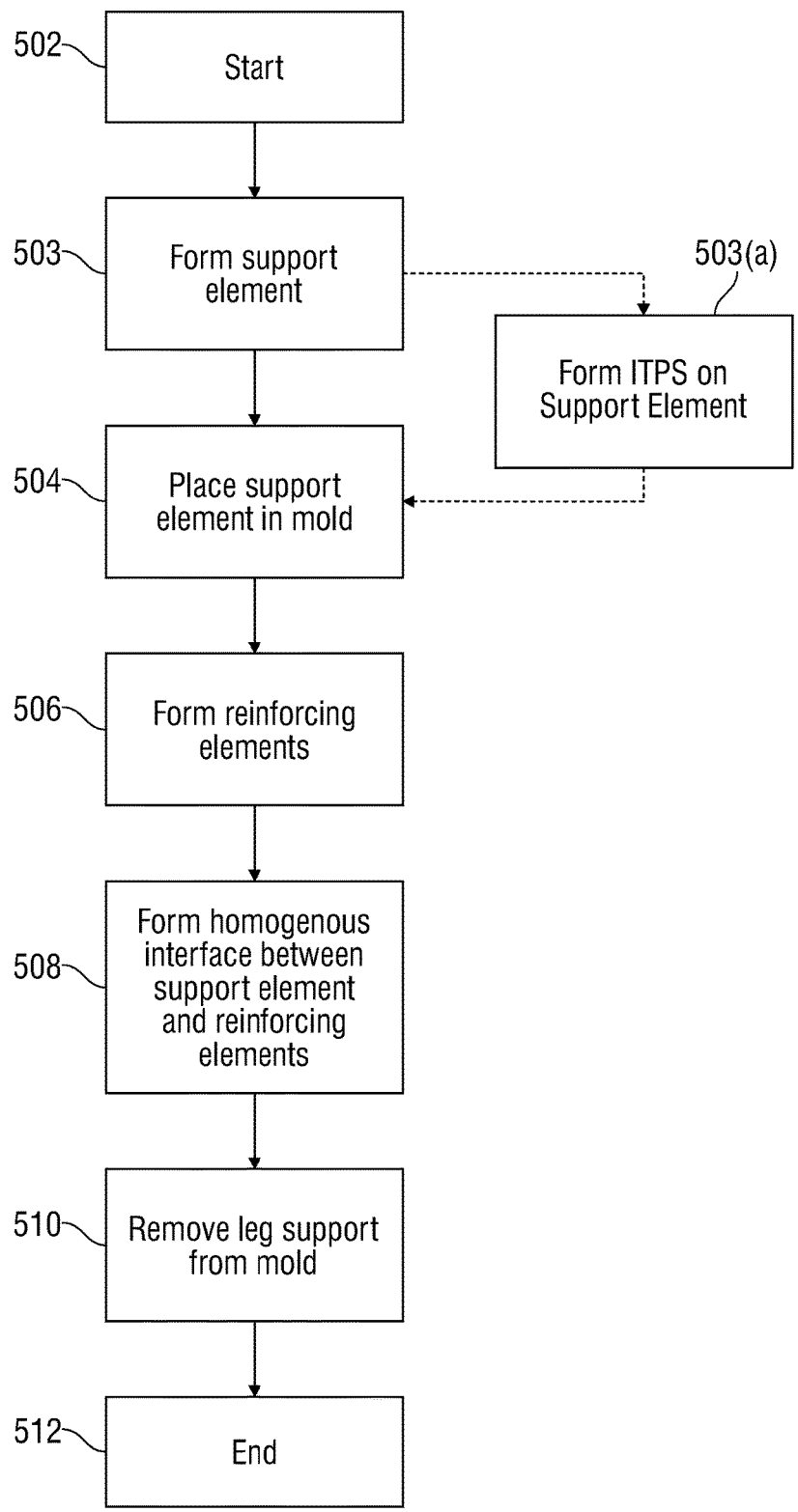

METHOD AND APPARATUS FOR A HOMOGENEOUS THERMOPLASTIC LEG SUPPORT

CROSS-REFERENCE TO RELATED APPLICATIONS

This application claims priority to, and incorporates by reference for any purpose the entire disclosure of, U.S. Provisional Patent Application No. 62/245,504, filed on Oct. 23, 2015.

BACKGROUND

Field of the Invention

The present application relates generally to commercial aircraft seats and more particular, but not by way of limitation, to a homogeneous thermoplastic leg support formed via homogeneous chemical bonding of thermoplastic components.

History of the Related Art

In the commercial aircraft industry, weight and safety are important issues. For example, a weight savings on structural components such as leg supports can add up to significant weight savings for the aircraft as a whole due, in no small part to the large number of seats. The weight saving in turn may reduce then fuel expenditure and provide a cost savings. In the specific case of leg supports, any such weight reduction must not adversely affect strength. Typically, governmental rules and regulations and industry structural performance requirements specify strength requirements for aircraft elements, and at the very least, strength issues may impact durability and expected lifespan of an element, such as a leg support. Cost is also a driving factor in the commercial aircraft industry, so low-cost manufacturing techniques may be important as well. Disclosed embodiments herein relate to improved leg support embodiments that may address one or more of these issues.

SUMMARY

The present application relates generally to commercial aircraft seats and more particular, but not by way of limitation, to a homogeneous thermoplastic leg support formed via homogeneous chemical bonding of thermoplastic components. In one aspect, the present invention relates to a leg support. A leg support includes a support element. A reinforcing element is disposed on the support element. The support element is chemically compatible with the reinforcing element. A homogeneous chemical bond is formed between the support element and the reinforcing element.

In another aspect, the present invention relates to a leg support in which a plurality of apertures are formed through the support element and the reinforcing elements penetrate the plurality of apertures. In another aspect, the present invention relates to a leg support in which a homogeneous failure module is disposed in the thermoplastic support element.

In another aspect, the present invention relates to a method of forming a thermoplastic leg support. A method of forming a thermoplastic leg support includes forming a support element and arranging the support element in a mold. The method further includes molding a reinforcing element to the support element. A homogeneous chemical bond is created between the support element and the reinforcing element.

BRIEF DESCRIPTION OF THE DRAWINGS

For a more complete understanding of the present invention and for further objects and advantages thereof, reference may now be had to the following description taken in conjunction with the accompanying drawings in which:

FIG. 5 is a flow diagram of a process for forming a leg support according to an exemplary embodiment.

DETAILED DESCRIPTION

Figure 1:
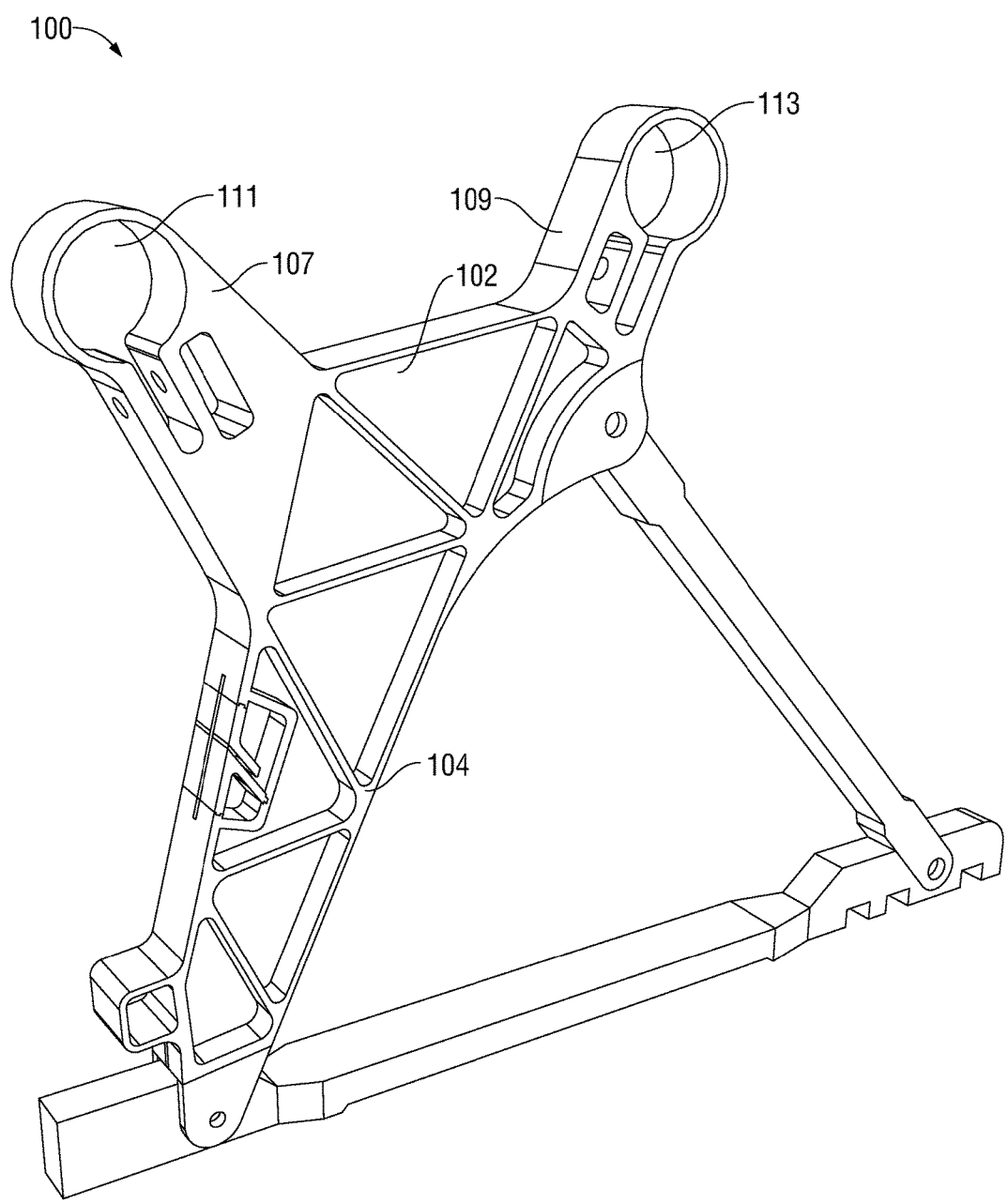
FIG. 1 is a perspective view of a leg support according to an exemplary embodiment.

Various embodiments of the present invention will now be described more fully with reference to the accompanying drawings. The invention may, however, be embodied in many different forms and should not be construed as limited to the embodiments set forth herein.

Some disclosed embodiments may generally relate to an extension of concepts of embodiments previously disclosed in related provisional U.S. patent application 61/711,567 and related U.S. non-provisional patent application Ser. No. 14/048,840, entitled Thermoplastic Injection Molded Element with Integral Thermoplastic Positioning System for Reinforced Composite Structures, filed respectively Oct. 9, 2012 and Oct. 8, 2013, which are co-owned and hereby incorporated by reference to the extent they do not contradict the express disclosure herein.

Leg support embodiments are, in some embodiments, comprised of thermally formed and consolidated thermoplastic encapsulated unidirectional or weave carbon or glass reinforcing fiber composite configured to meet the minimum load requirement of the leg support. Such leg support embodiments may be further comprised of thermoplastic injection molded carbon or glass chopped fiber-reinforced reinforcing elements which are injection molded and homogenously attached to the thermoplastic encapsulated unidirectional or weave carbon or glass reinforced composite structure.

In some embodiments, the integral thermoplastic support element may further be comprised of application-specific support rib structures, mounting features and threaded insert mounting bosses. Such support element embodiments may further be comprised of integral injection molded thermoplastic positioning system spire elements that provide repeatable positioning of said support element to an injection mold tool cavity during the injection molding process, providing a repeatable consistent positional placement of said thermoplastic encapsulated reinforced fiber composite integral to the leg support thereby ensuring consistent load requirement performance.

Furthermore, in some embodiments, the integral thermoplastic support element embodiments may further comprise a plurality of apertures provided through at least one wall section of the thermoplastic encapsulated reinforced fiber composite. Such apertures provide a pathway for thermoplastic resin material of the reinforcing elements to flow through and about the thermoplastic reinforced composite to provide additional connective homogenous elements.

Such thermoplastic leg support embodiments may comply with FAR 25.853 and OSU55/55, with integral formed thermoplastic encapsulated uni-directional or weave carbon or glass reinforced composite element integrated with a thermoplastic injection molded carbon or glass chopped fiber-reinforced support element and integral thermoplastic positioning spire elements and a thermoplastic injection molded reinforcing element of the leg support providing a high strength-to-weight ratio assembly that meets the minimum performance requirements of the application.

Some disclosed embodiments may be comprised of chemical and molecular compatible thermoplastics resins throughout the assembly, creating an infinite number of homogenous connective attachments that provide additional consistent strength, dimensional stability and rigidity.

Some disclosed embodiments may provide increased mechanical load bearing capabilities provided by the integral formed thermoplastic carbon or glass reinforced composite element with the integral injection molded carbon or glass fiber reinforced thermoplastic support element by the infinite number of homogeneous connective interfaces.

In some embodiments, the integral formed thermoplastic encapsulated carbon or glass reinforced composite element may comprise multiple weave patterns, multiple layers and layer orientations to provide the optimum performance for the requirement load application.

Disclosed embodiments generally relate to leg supports, for example to be used with seat assemblies for aircraft. Typically, disclosed elements of a support structure within a leg support may comprise one or more layers of composite material. For example, the elements of the support structure might comprise a composite element having one or more layers of composite material. Each layer of composite material typically has reinforcing fibers such as, for example, a weave of reinforcing fibers located internally, with thermoplastic surrounding it. In a typical embodiment, the composite material typically would only have reinforcing fibers located internally, for example in a central plane. When multiple layers of composite material form the elements of assembly, the multiple layers of composite typically would be thermally or homogeneously joined or otherwise consolidated together to form a unitary structure with homogeneous connective interface throughout. Typically, the one or more layers of composite material may be shaped into the form of the elements of the leg support, configured to attach to an airline seat assembly.

In some embodiments, one or more of the elements of the leg support might be injection molded onto the composite material, and since the elements typically would be formed of the same thermoplastic as the composite material, the elements typically would be thermally formed and homogeneously connected to the composite material. Specific embodiments related to the figures will be discussed in more detail below.

For example, the composite material typically may comprise an array of reinforcing fibers such as, for example, carbon, graphite, glass, or aramid. The reinforcing fibers typically include carbon microscopic crystals aligned parallel to the longitudinal axis of the carbon fibers such as, for example, aligned in a precise orientation, and a thermoplastic material located about the array of reinforcing fibers. The array of fibers may be a weave pattern such as, for example, a five harness satin weave, in some embodiments, while in other embodiments the array of fibers may be aligned uni-directionally in a parallel linear pattern. In some embodiments, the composite might be provided in pre-defined or pre-formed solid three dimensional geometries, such as a solid sheet, which can then be shaped according to the needs of the specific element such as, for example, by heat forming or cutting. Since such a composite material typically may be a rigid solid at room temperature and only softens sufficiently to allow shaping such as bending or twisting at elevated temperatures, there would typically be no need for an external frame to hold the composite in the desired shape and/or position while forming encapsulating thermoplastic about the composite using injection molding in order to form any desired additional element. In other words, once the composite sheet material is shaped as desired for the particular support structure and has cooled to room temperature, it is a rigid solid that will independently hold the shape in question, and should not need any framework to hold its shape within the mold for forming thermoplastic elements onto the composite.

In other embodiments, the composite material may be formed by layering thermoplastic film and reinforcing fiber cloth or weave, which would then be consolidated such as, for example, via heat or compression into a unitary composite material with reinforcing fibers located between two thermoplastic layers. For example, each composite material layer might comprise two thermoplastic film layers sandwiching or surrounding a layer of reinforcing fiber. The one or more layers of composite might then be placed on a press mold for the shape of a leg support structure, with the press mold then being used to consolidate the one or more layers of composite, thereby forming the composite support structure for use with a leg support.

The array of fibers of the composite material is typically located near the center of the composite material, with thermoplastic material located atop and beneath the array of fibers. In other words, a single layer or single ply of the composite material would typically have all of the reinforcing fibers located in a single/central plane, with the rest of the thickness of the composite material being formed of thermoplastic material; and multi-layer or multi-ply composite elements would typically have several layers or plies, each comprised of reinforcing fibers located in a single/central plane, with the rest of the thickness being formed of thermoplastic material. The centrally located reinforcement of each adjoining layer or ply may be independent to the adjacent adjoining layer or ply. Each centrally located reinforcement layer or ply might have an equal volume of thermoplastic located atop and beneath the array of fibers, providing a consistent dimensional separation between the reinforcing array of fibers. Regardless, the composite typically might provide approximately consistent fiber distribution throughout the element, so that it can provide precise and consistent/reproducible structural and/or mechanical support.

Figure 2:
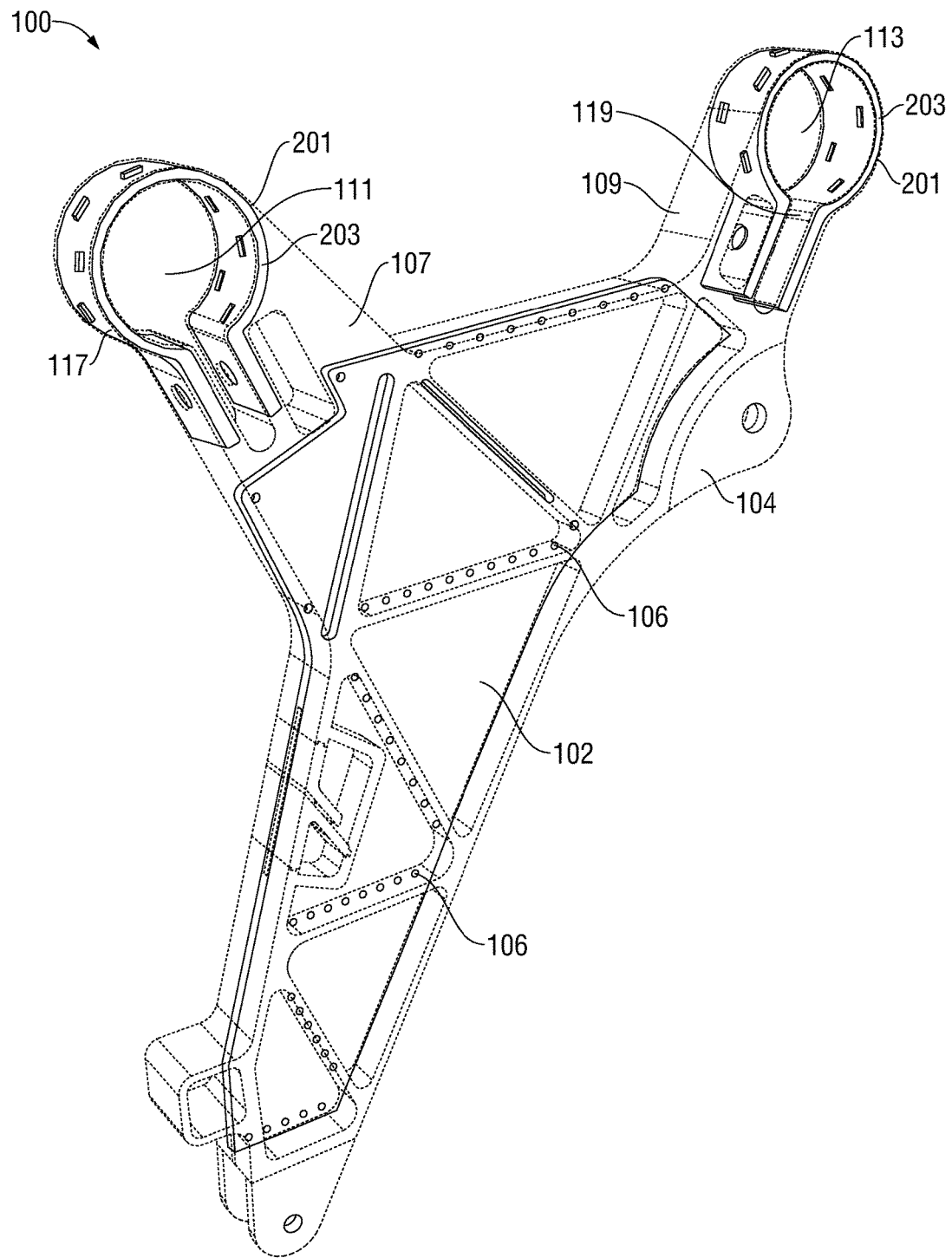
FIG. 2 is a perspective view of the leg support of FIG. 1 showing internal features thereof according to an exemplary embodiment.

Referring first to FIG. 1, there is shown a perspective view of a leg support 100. FIG. 2 is a perspective view of the leg support 100 showing internal features of the leg support 100 of FIG. 1. Referring to FIGS. 1-2 collectively, the leg support 100 includes a centrally-disposed support element 102 integrally formed with a plurality of reinforcing elements 104 coupled thereto. In a typical embodiment, the support element 102 includes a carbon or glass reinforced thermoplastic laminate material such as, for example, a thermally-consolidated composite material forming a composite structure. In some embodiments, the support element 102 may be formed of the carbon reinforced thermoplastic material such as, for example, composite material and the reinforcing elements 104 may be molded onto the support element 102. In a typical embodiment, the reinforcing elements 104 comprise a thermoplastic material with a resin compatible with the resin of the support element 102. Typically, the thermoplastic of the reinforcing elements 104 would be the same as the thermoplastic of the composite of the support element 102 so that molding results in chemically-compatible homogenous connections.

Still referring to FIG. 1-2, in various embodiments, the support element 102 may be substantially flat and comprise a generally planar shape. In other embodiments, the support element 102 may include a form such as, for example, a corrugation that is generally parallel to the long axis of the support element 102 to enhance the strength of the support element 102. A plurality of apertures 106 are formed in the support element 102. The apertures 106 are illustrated in FIG. 2 as being disposed along a perimeter of the support element 102; however, in other embodiments, the apertures 106 may be located at any position along the support element 102.

In other embodiments, the support element 102 may be formed of thermoplastic injection molded material. In such an embodiment, the apertures 106 are formed in the support element 102 during injection molding. In still other embodiments, the support element 102 may be a combination of thermally-consolidated composite laminate or reinforced injection-molded thermoplastic. In such an embodiment, the thermally-consolidated composite laminate and the reinforced injection-molded thermoplastic are chemically compatible so that a homogenous chemical bond is formed between the portion of the support element 102 comprising the thermally-consolidated composite laminate and the portion of the support element 102 comprising the injection-molded thermoplastic.

In a typical embodiment, the reinforcing elements 104 are joined to the support element 102 via an integration process. Typically, the reinforcing members 104 are injection molded onto the support element 102. As illustrated in FIGS. 1-2, the reinforcing elements 104 are typically applied to the support element 102 in a symmetrical fashion; however in other embodiments, the reinforcing elements 104 may be applied in an asymmetrical fashion as dictated by design requirements. In a typical embodiment, the reinforcing elements 104 are constructed of a material that is chemically compatible with the support elements 102 so that a homogenous chemical bond is formed between the support element 102 and the reinforcing elements 104. During injection molding of the reinforcing elements 104, material comprising the reinforcing elements 104 flows through the apertures 106 formed in the support element 102. Such an arrangement facilitates bonding the support element 102 to the reinforcing elements 104 and enhances strength and rigidity of the leg support 100.

Still referring to FIGS. 1-2, the reinforcing element 104 includes a first over molded portion 107 and a second over molded portion 109. The first over molded portion 107 and the second over molded portion 109 include a first attachment aperture 111 and a second attachment aperture 113, respectively. In a typical embodiment, the first attachment aperture 111 and the second attachment aperture 113 facilitate connection of the leg support 100 to, for example, an aircraft seat. A first reinforcement loop 117 is disposed in the first attachment aperture 111 and a second reinforcement loop 119 is disposed in the second attachment aperture 113. In various embodiments, the first reinforcement loop 117 and the second reinforcement loop 119 may be formed of thermoplastic composite laminate material. Alternatively, the first reinforcement loop 117 and the second reinforcement loop 119 may be formed of injection molded carbon or glass-reinforced thermoplastic. In a typical embodiment, the first reinforcement loop 117 and the second reinforcement loop 119 include apertures to allow flow of thermoplastic material and facilitate formation integration with the reinforcing elements 104. In various embodiments, the first reinforcement loop 117 and the second reinforcement loop 119 include an integrated thermoplastic positioning system ("ITPS") 201. The ITPS includes spires 203 that facilitate positioning the first reinforcement loop 117 and the second reinforcement loop 119 within a mold.

Still referring to FIGS. 1-2, in a typical embodiment, the reinforcing elements 104 are applied to a perimeter of the support element 102; however, in other embodiments, the reinforcing elements 104 could be applied to the support element 102 at any location. During application of the reinforcing elements 104, the support element 102 together with the first reinforcement loop 117 and the second reinforcement loop 119 is installed into an injection molding tool. In various embodiments, the support element 102 may comprise a thermoplastic composite laminate material; however, in other embodiments, the support element 102 may comprise a thermoplastic injection molded panel. Exposed portions of the support element 102 are used to locate the support element 102 in the mold tool. Thermoplastic material is injection molded onto the support element 102 to form the reinforcing elements 104 as well as the first over molded portion 107 and the second over molded portion 109. As shown in FIG. 2, in various embodiments, the ITPS 201 is utilized when forming the first over molded portion 107 and the second over molded portion 109 around the first reinforcement loop 117 and the second reinforcement loop 19. The ITPS 201 includes a latticework having a plurality of spires or projections 203 extending outwardly distally. In a typical embodiment, the spires 203 act to hold the first reinforcement loop 117 and the second reinforcement loop 119 in position during molding of the reinforcing element 104 as well as the first over molded portion 107 and the second over molded portion 109 and typically will fix a position of the first reinforcement loop 117 and the second reinforcement loop 119 in three dimensions.

In a typical embodiment, the reinforcing elements 104 are fiber reinforced such as, for example, carbon or glass fiber reinforced. During injection molding, the thermoplastic material flows through the apertures 106 formed in the support element 102 thereby enhancing increased strength and rigidity of the leg support 100. In a typical embodiment, the reinforcing elements 104 are formed of a material that is chemically-compatible with the support element 102 thereby facilitating formation of a chemically homogenous molecular bond between the support element 102 and the reinforcing elements 104.

Still referring to FIGS. 1-2, in embodiments where the support element 102 is formed of an injection molded thermoplastic material, use of two differing injection-molding processes to form the support element 102 and the reinforcing elements 104 facilitates utilization of materials of differing reinforcement types and levels for the support element 102 and the reinforcing elements 104. For example, in various embodiments, the reinforcing elements 104 may comprise a standard modulus and length reinforcing fiber having a tensile strength of approximately 530 ksi and a tensile modulus of approximately 105 MSI, and the support element 102 may comprise a high modulus long-fiber reinforcement having a tensile strength and a tensile modulus greater than the standard values listed above. Such an embodiment facilitates use of lower cost materials during production of the leg support 100. The support element 102 is illustrated by way of example in FIGS. 1-2 as extending a full length of the leg support 100. However, in other embodiments, the support element 102 extends partially along a length of the leg support 100 as dictated by design requirements.

Figure 3:
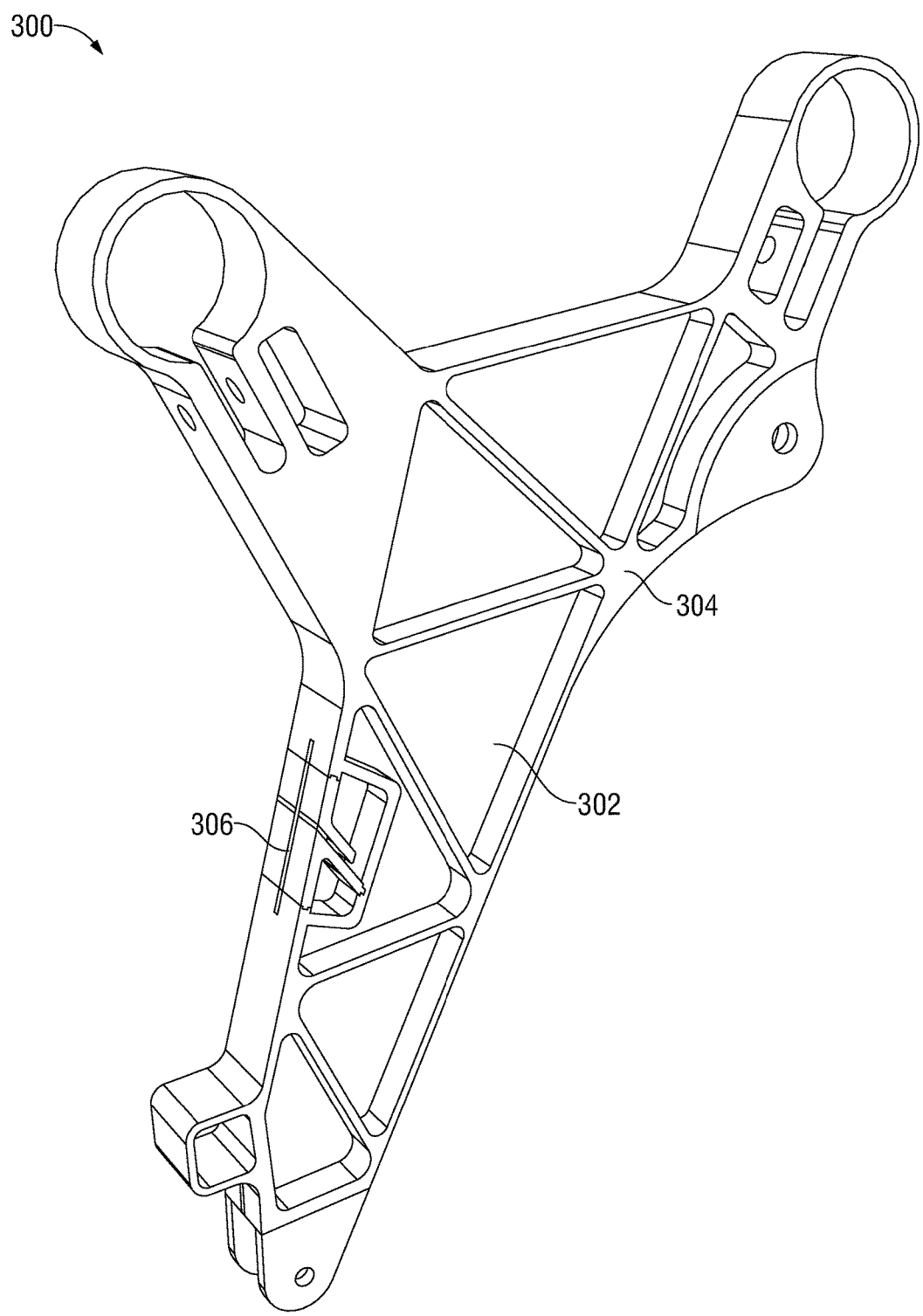
FIG. 3 is a perspective view of leg support having a homogenous failure module ("HFM") incorporated therewith according to an exemplary embodiment.
Figure 4:
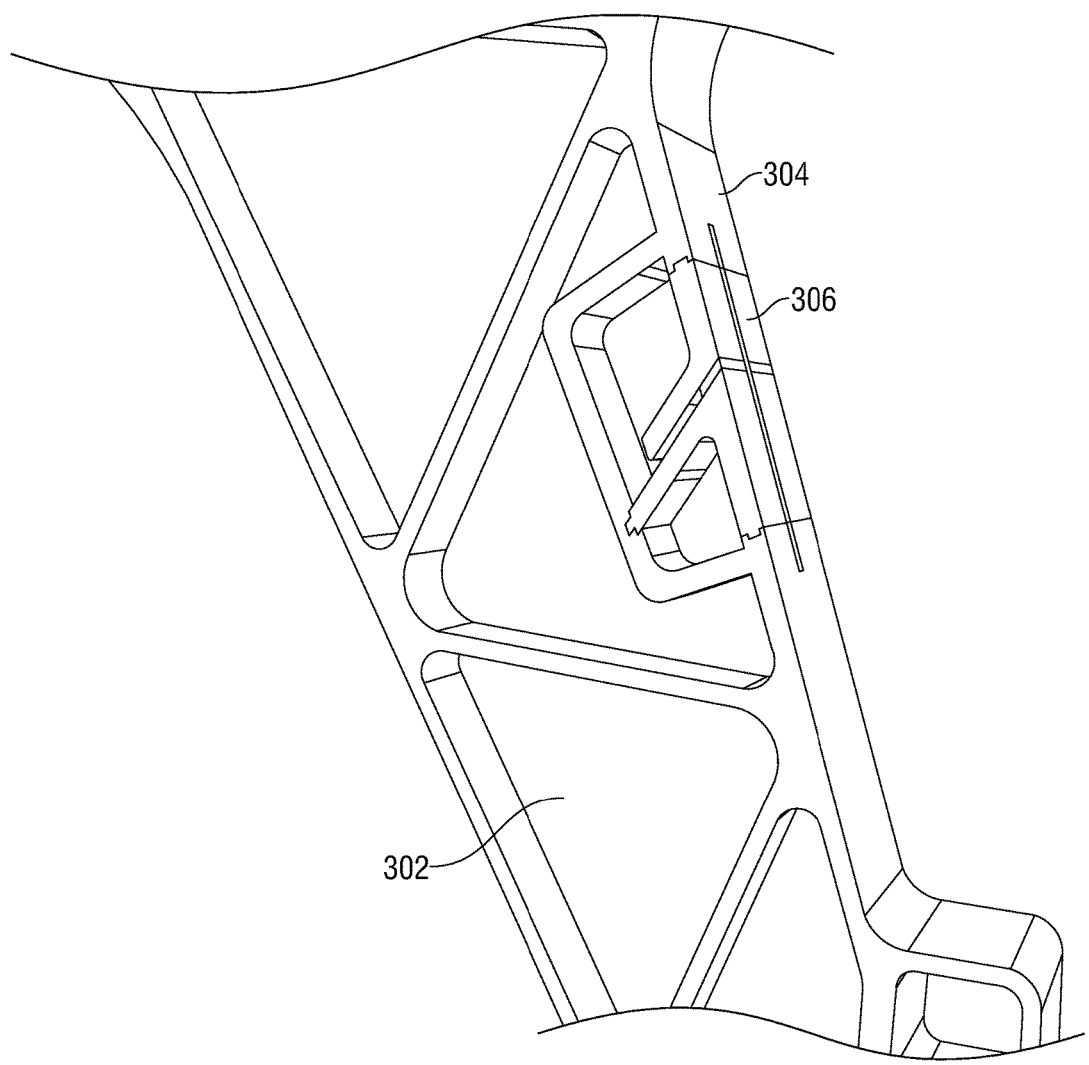
FIG. 4 is a perspective view of leg support having the HFM incorporated therewith according to an exemplary embodiment.

FIG. 3 is a perspective view of a leg support 300 having a homogenous failure module ("HFM") 306 incorporated therewith. FIG. 4 is a perspective view of the leg support 300. The HFM 306 is disposed in the support element 302 and the reinforcing elements 304 at a specified location so as to induce failure of the leg support 300 at a desired location. Such selected failure facilitates predictable failure of the leg support 300 in a desired direction and mode. The HFM 306 includes a carbon-reinforced structure. The HFM 306 is designed to fail at the specified location based upon the leg support's 300 specific application. All elements of the environment of use are considered, along with the tolerable end result in the case of a system failure. The HFM 306 is the initial mechanism to allow stress to overcome, for example, the leg support 300 in a controlled manner. Once the HFM 306 fails, the particular failure precipitates the next failure in the system. The HFM 306 will fail in a specific manner which in turn applies loads (stress) to a location in a specific manner, causing the system to fail at that predefined position with an end result (condition) that does not create an object of lethality or interference to movement or egress. In various embodiments, the HFM 306 may be used in conjunction with the leg support 300.

FIG. 5 is a flow diagram of a process 500 for forming a leg support. For purposes of illustration, FIG. 5 will be described herein relative to FIGS. 1-4. The process starts a step 502. At step 503, the support element 102 is formed. In a typical embodiment, the support element 102 may be formed of a composite material or a reinforced thermoplastic material. At step 503(a), an ITPS is formed on the support element 102. In a typical embodiment, the ITPS is formed on the support element 102 via, for example, an injection molding process. In various embodiments, step 503(a) may be omitted as dictated by design requirements. At step 504 the support element 102 is placed in a mold. During step 504, an ITPS may be utilized to position the support elements 102. At step 506, thermoplastic material is injection molded onto the support element 102 to form the reinforcing elements 104 as well as the first over molded portion 107 and the second over molded portion 109. The thermoplastic material penetrates the apertures 106 formed in the support element 102. At step 508, a chemically compatible homogenous bond is formed between the support element 102 and the thermoplastic material of the reinforcing elements 104 at all contact points. Formation of the chemically compatible homogenous bond facilitates creation of the homogenous single-piece leg support 100. At step 510, the leg support 100 is removed from the mold. The process ends at step 512.

The advantages of the present invention will be apparent to those skilled in the art. In a typical embodiment, the leg support 100 provides increased load bearing capacity facilitated by the integrally formed reinforcing elements 104 being integrated into the support element 102. Additionally, the leg support 100 may decrease the physical dimensions of leg supports presently in use by virtue of using a plurality of high strength-to-weight materials. When utilized in conjunction with the HFM 602, the leg support 100 will fail in a predictable repeatable manner responsive to application of defined loading.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

I claim:

1. A leg support comprising:
   a thermoplastic composite leg support element;
   at least one reinforcing element disposed on the thermoplastic composite leg support element, the at least one reinforcing element being chemically compatible with the thermoplastic composite leg support element; and wherein a homogeneous chemical bond is formed between the thermoplastic composite leg support element and the at least one reinforcing element, wherein the thermoplastic composite leg support element comprises an integral thermoplastic positioning system;
   a plurality of apertures formed through the thermoplastic composite leg support element, wherein at least one of said at least one reinforcing elements penetrate the plurality of apertures; and
   wherein said thermoplastic composite leg support element comprises a thermoplastic, and wherein said at least one reinforcing element comprise a thermoplastic, and wherein the thermoplastic for the thermoplastic composite leg support is the same as the thermoplastic for said at least one reinforcing element.

2. The leg support of claim 1 wherein a homogenous chemical bond is formed between at least one reinforcing element and at least one of said plurality of apertures.

3. The leg support of claim 1, wherein the thermoplastic composite leg support element has a front face and an opposing rear face, and wherein said plurality of apertures extend from said front face to said opposing rear face, and wherein at least one of said at least one reinforcing elements extends from said front face to said rear face through said plurality of apertures.

4. A leg support comprising:
   a thermoplastic composite leg support element;
   at least one reinforcing element disposed on the thermoplastic composite leg support element, the at least one reinforcing element being chemically compatible with the thermoplastic composite leg support element; and wherein a homogeneous chemical bond is formed between the thermoplastic composite leg support element and the at least one reinforcing element, wherein the thermoplastic composite leg support element comprises an integral thermoplastic positioning system;
   a plurality of apertures formed through the thermoplastic composite leg support element, wherein at least one of said at least one reinforcing elements penetrate the plurality of apertures; and
   wherein said at least one reinforcing elements comprises two reinforcing elements, and wherein the thermoplastic composite leg support element is centrally located between said two reinforcing elements.

5. The leg support of claim 1, wherein the thermoplastic composite leg support is injection molded.

6. The leg support of claim 1, wherein the thermoplastic composite leg support comprises composite material.

7. A leg support comprising:
   a thermoplastic composite leg support element;

at least one reinforcing element disposed on the thermoplastic composite leg support element, the at least one reinforcing element being chemically compatible with the thermoplastic composite leg support element; and wherein a homogeneous chemical bond is formed between the thermoplastic composite leg support element and the at least one reinforcing element, wherein the thermoplastic composite leg support element comprises an integral thermoplastic positioning system;

a plurality of apertures formed through the thermoplastic composite leg support element, wherein at least one of said at least one reinforcing elements penetrate the plurality of apertures; and further comprising a homogenous failure module disposed in the thermoplastic composite support element.

8. The leg support of claim 1, wherein the thermoplastic composite leg support element comprises a tensile modulus, and wherein the at least one reinforcing element comprises a tensile module, and wherein the tensile modulus of the thermoplastic composite leg support element is greater than the tensile modulus of the at least one reinforcing element.

* * * * *